US011922460B2

(12) United States Patent
Kusens et al.

(10) Patent No.: US 11,922,460 B2
(45) Date of Patent: Mar. 5, 2024

(54) ELECTRONIC IDENTIFICATION, LOCATION TRACKING, COMMUNICATION AND NOTIFICATION SYSTEM

(71) Applicant: COLLATERAL OPPORTUNITIES, LLC, Wilmington, DE (US)

(72) Inventors: Bruce Howard Kusens, North Miami Beach, FL (US); Michael Kusens, Southwest Ranches, FL (US); Arthur Miller, Las Vegas, NV (US)

(73) Assignee: COLLATERAL OPPORTUNITIES OF NEVADA, LLC, Washington, DC (US)

( * ) Notice: Subject to any disclaimer, the term of this patent is extended or adjusted under 35 U.S.C. 154(b) by 0 days.

(21) Appl. No.: 16/416,247

(22) Filed: May 19, 2019

(65) Prior Publication Data

US 2019/0279251 A1    Sep. 12, 2019

Related U.S. Application Data

(63) Continuation of application No. 14/866,756, filed on Sep. 25, 2015, now Pat. No. 10,296,945.

(60) Provisional application No. 62/055,945, filed on Sep. 26, 2014.

(51) Int. Cl.
| | |
|---|---|
| *G06Q 30/00* | (2023.01) |
| *G06Q 10/0833* | (2023.01) |
| *G06Q 30/0251* | (2023.01) |
| *G06Q 30/0601* | (2023.01) |
| *H04W 4/02* | (2018.01) |
| *H04W 4/021* | (2018.01) |

(52) U.S. Cl.
CPC ...... *G06Q 30/0261* (2013.01); *G06Q 10/0833* (2013.01); *G06Q 30/0639* (2013.01); *H04W 4/021* (2013.01); *H04W 4/023* (2013.01)

(58) Field of Classification Search
CPC .......... G06Q 30/0261; G06Q 30/0639; G06Q 10/0833; H04W 4/021; H04W 4/023
See application file for complete search history.

(56) References Cited

U.S. PATENT DOCUMENTS 9,324,202 B2 * 4/2016 Lindig ................. G06Q 90/00
9,787,848 B2 * 10/2017 Kaye ....................... H04W 4/12
9,847,679 B2 * 12/2017 Bell ........................ H02J 50/20

(Continued)

OTHER PUBLICATIONS

"A New Approach For Location-Based Tracking," by Shaveta Bhatia and Saba Hilal, International Journal of Computer Science Issues, vol. 10, Issue 3, No. 1, May 2013 (Year: 2013).*

*Primary Examiner* — Anne M Georgalas
(74) *Attorney, Agent, or Firm* — DANIEL S. POLLEY, P.A.

(57) ABSTRACT

A system and method for identifying a customer's location within a facility or place of business, such as, but not limited to a casino. The system and method provides notification company representatives upon arrival of the customer at the given location. Additionally, the method and system allows for navigational services to be provided to customers, and real-time location determination, location tracking and confirmation to customers of location and rewards program status. The disclosed method and system can work through a system of wireless radio, sound and/or light-based beacons communicating with the customer's smartphone, computer system, or other electronic device.

16 Claims, 6 Drawing Sheets

Determination of Presence at Location – Embodiment B

(56) References Cited

U.S. PATENT DOCUMENTS

| | | | |
|---|---|---|---|
| 11,348,139 B1* | 5/2022 | Krishna | G06Q 30/0267 |
| 2005/0136845 A1* | 6/2005 | Masuoka | G01S 1/68 |
| | | | 455/67.14 |
| 2008/0109317 A1* | 5/2008 | Singh | G06Q 30/0254 |
| | | | 705/14.5 |
| 2013/0229263 A1* | 9/2013 | Graczyk | G08C 23/04 |
| | | | 340/10.1 |
| 2014/0364103 A1* | 12/2014 | Marti | H04W 4/029 |
| | | | 455/418 |
| 2014/0379529 A1* | 12/2014 | Agasti | H04W 4/02 |
| | | | 705/26.81 |
| 2015/0081382 A1* | 3/2015 | L'Heureux | G06Q 30/0261 |
| | | | 705/7.29 |
| 2015/0154674 A1* | 6/2015 | Todasco | G06Q 30/0631 |
| | | | 705/26.7 |
| 2015/0348049 A1* | 12/2015 | Todasco | G06Q 50/12 |
| | | | 705/14.1 |
| 2020/0036592 A1* | 1/2020 | Kholaif | H04L 67/306 |

* cited by examiner

FIGURE 1: Registration of Customer's Device
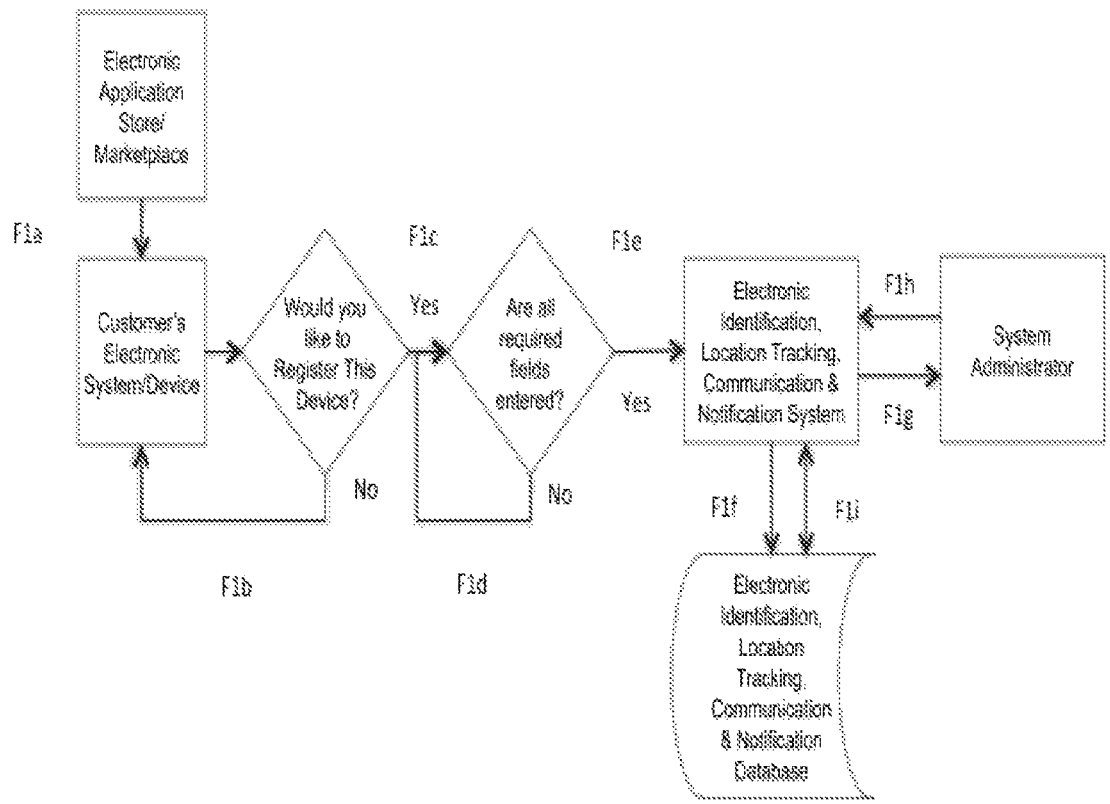
FIGURE 2: Registering a Beacon Location
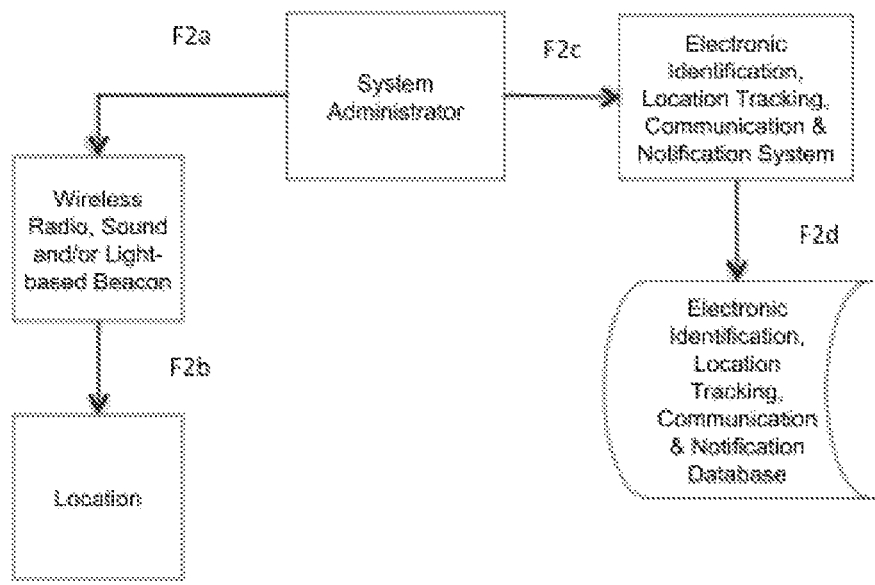

FIGURE 3: Determination of Presence at Location – Embodiment A
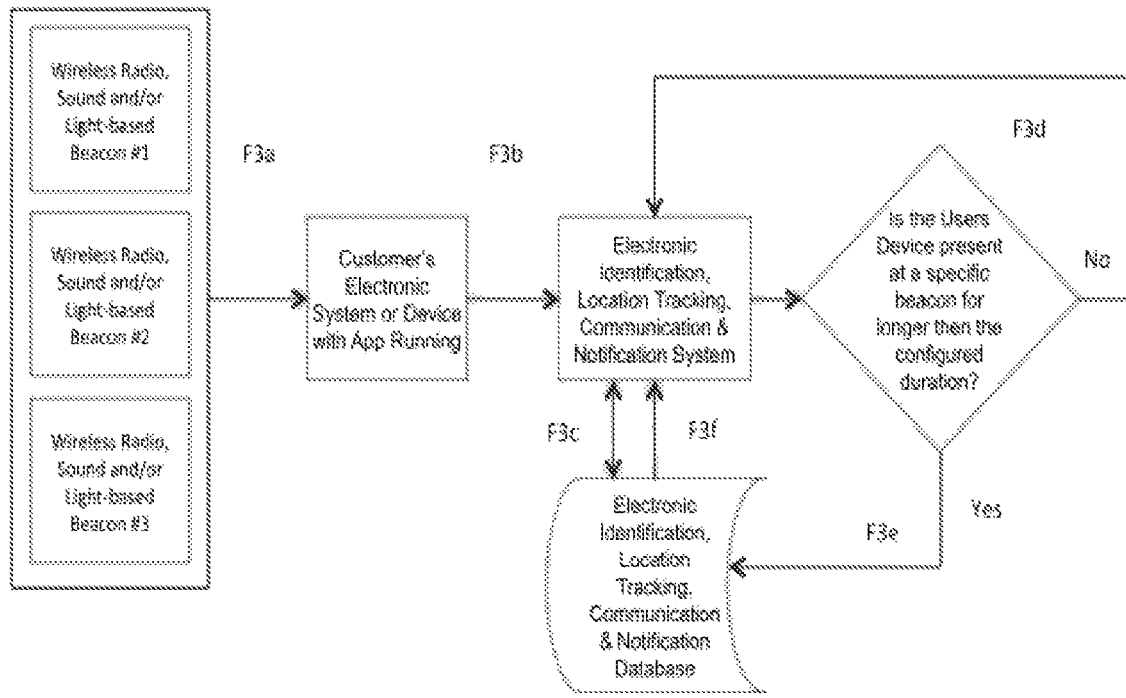
FIGURE 4: Determination of Presence at Location – Embodiment B
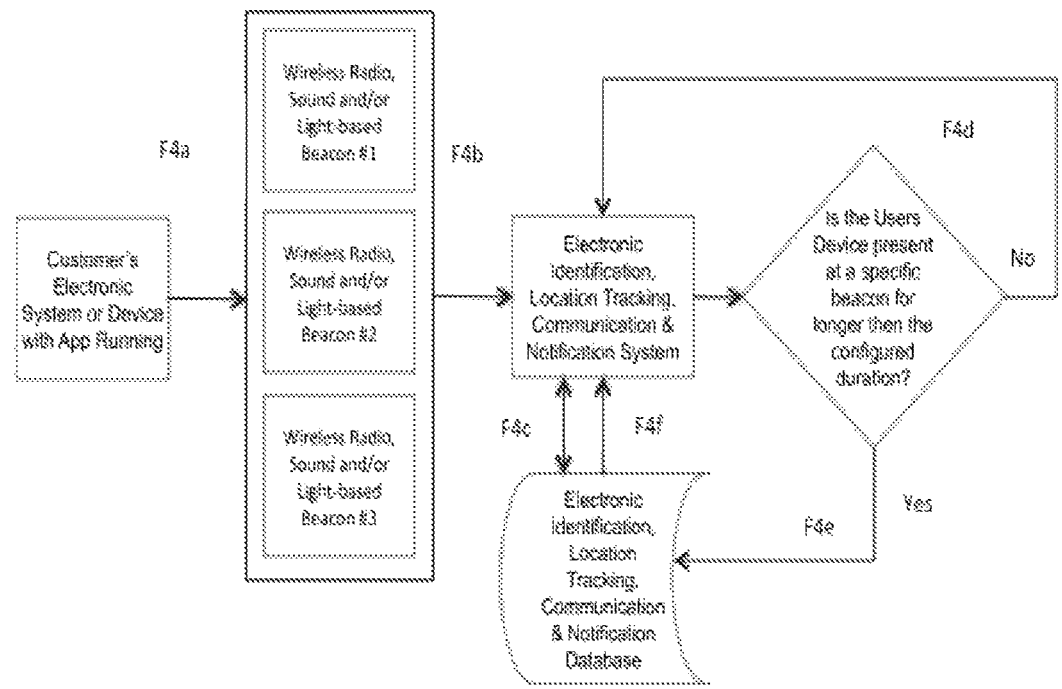

FIGURE 5: Notification Rules Engine
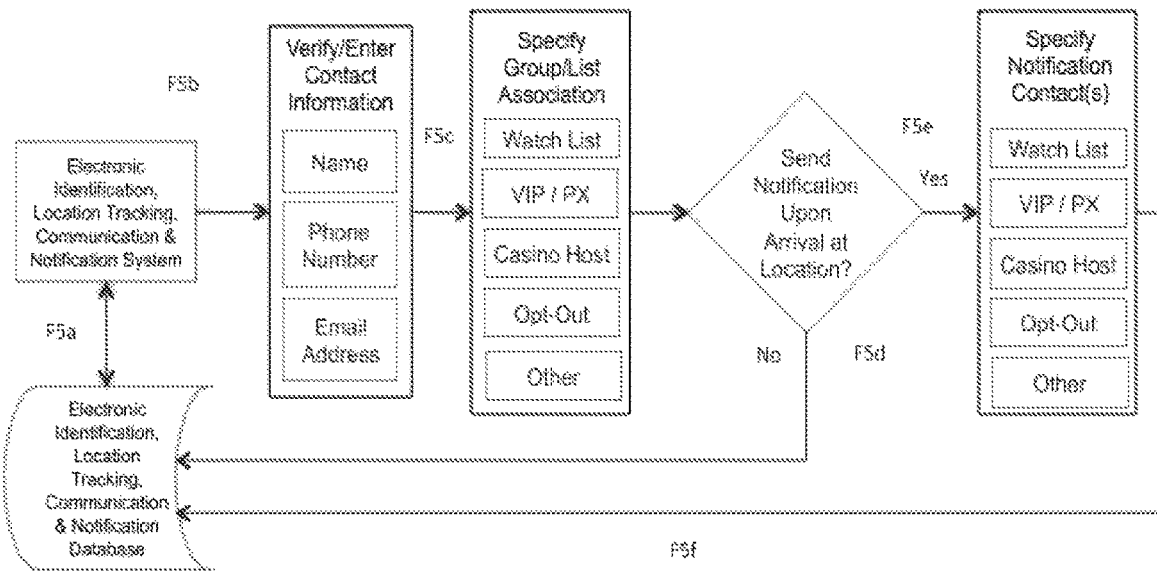
FIGURE 6: Determination and Delivery of Notifications
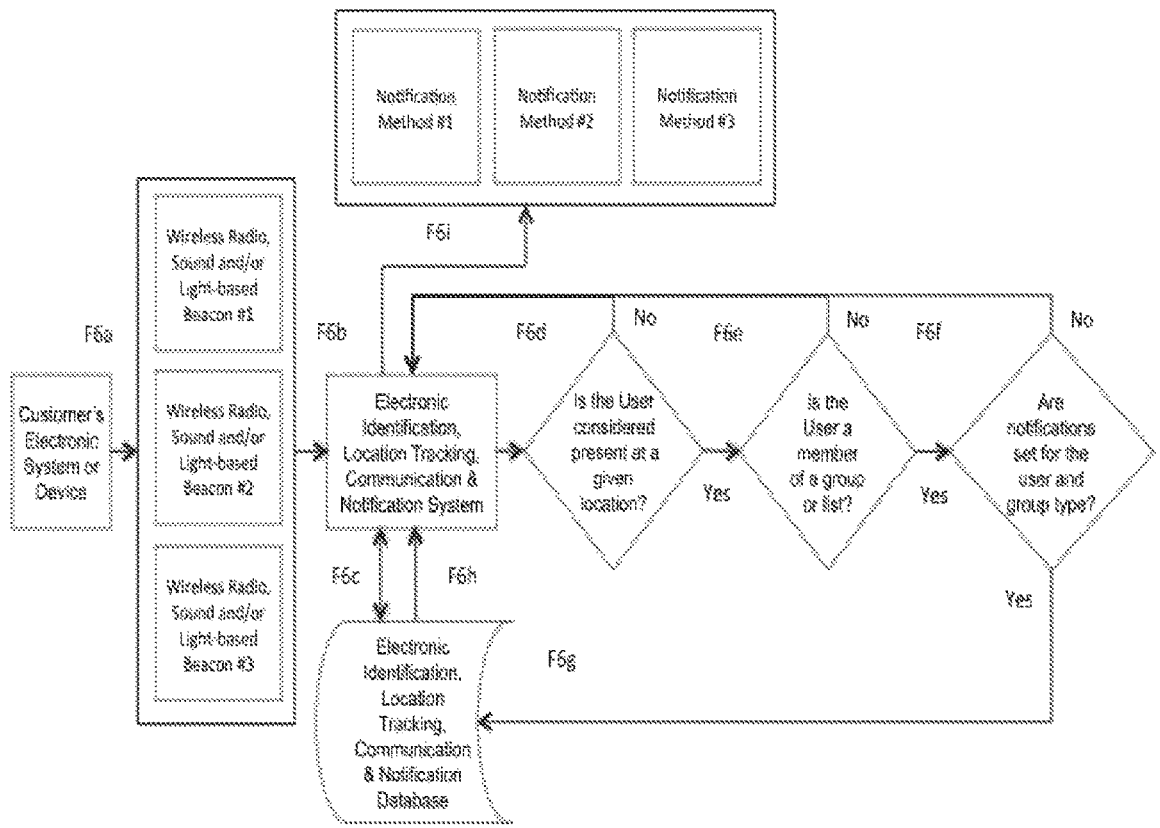

FIGURE 7: Determination and Delivery of Notifications – Embodiment B
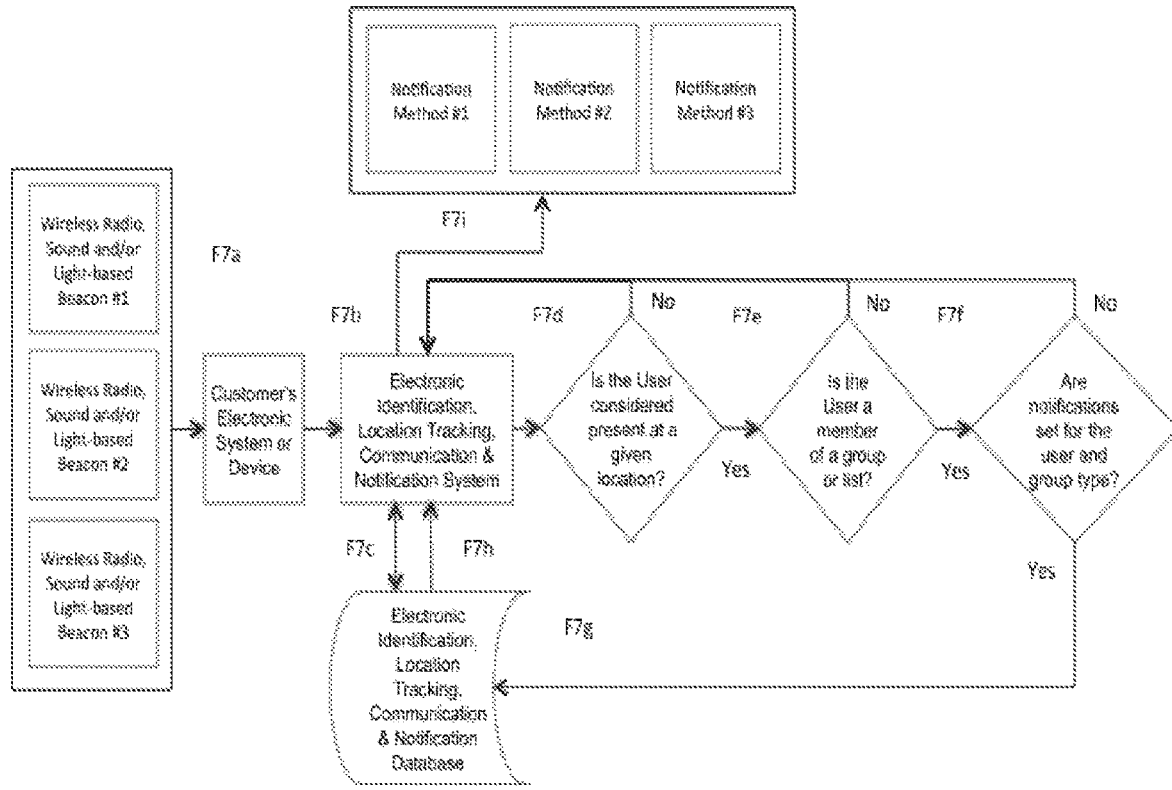
FIGURE 8: Presence Determination at a Location Rules Engine
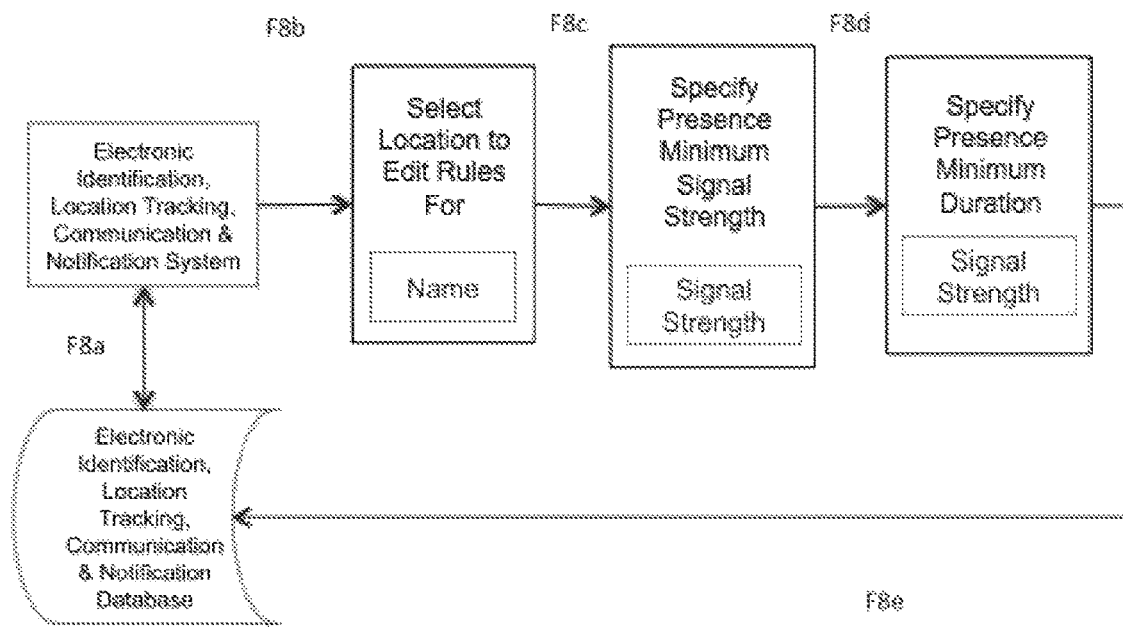

FIGURE 9: Process to Order Goods and/or Services from App
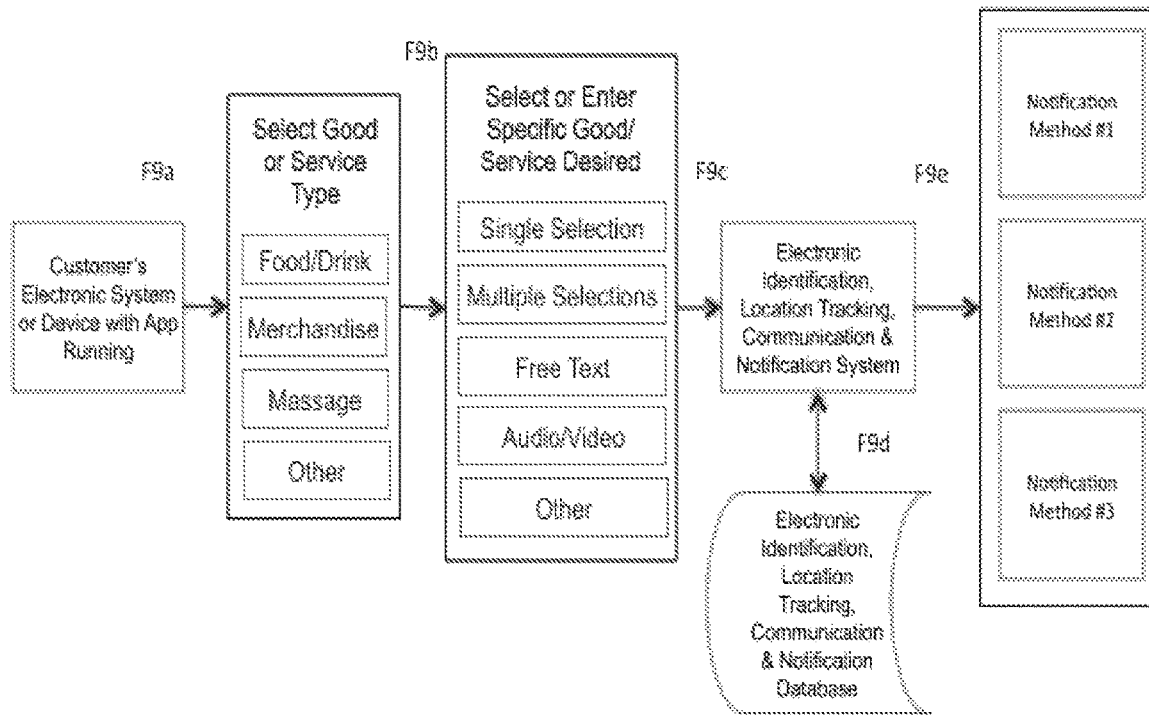
FIGURE 10: Delivery of Good and/or Services to Customers Current Location
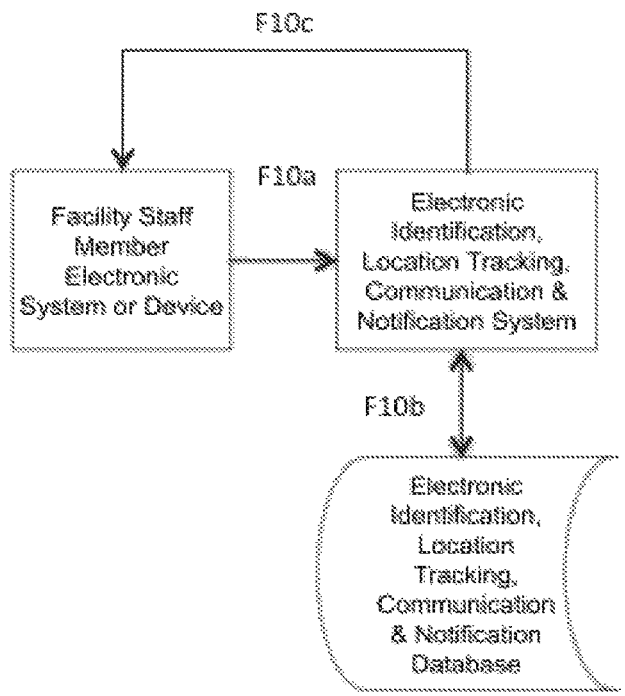

FIGURE 11: Customer Opt-Out of Rating/Monitoring by Facility
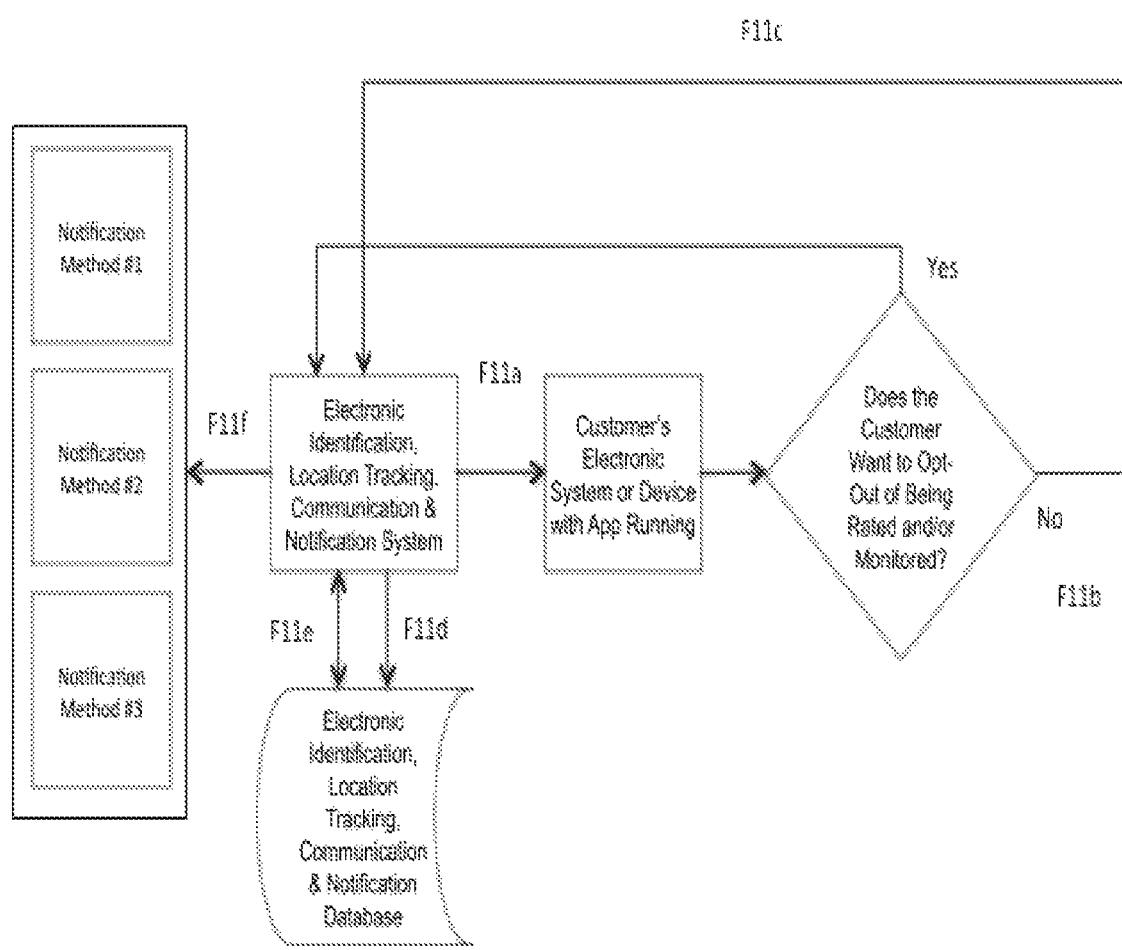

ELECTRONIC IDENTIFICATION, LOCATION TRACKING, COMMUNICATION AND NOTIFICATION SYSTEM

This application is a continuation of U.S. application Ser. No. 14/866,756, filed Sep. 25, 2015, which application claims the benefit of and priority to U.S. Provisional Patent Application Ser. No. 62/055,945, filed Sep. 26, 2014. Both applications are incorporated by reference in their entireties for all purposes.

BACKGROUND

The hospitality industry is highly competitive with companies always looking for competitive advantages, whether it be on price, features or customer service. In recent years, in an effort to differentiate themselves from other competitors, many hospitality companies such as Hotels, Restaurants and Casinos have implemented customer reward and tracking programs. These programs reward customers for a variety of reasons including, but not limited to, spending time at specific locations, spending money at specific locations and performing certain activities. Additionally, the reward programs provide a treasure trove of data for the companies on their customers, which assist in marketing efforts, administrative decisions and more.

Current systems require both the customer and company to proactively perform a manual task in order to be recognized at the location and receive the proper rewards program recognition. Most of the time this is done by the customer handing a card to a company representative and that card information then entered into an existing system. This process is often insufficient for proper tracking of the customer, time consuming and dependent on the customer physically remembering to hand the card to the company representative. It is to addressing or reducing these problems that the current disclosure is directed.

SUMMARY OF THE DISCLOSURE

A method is described that allows companies (as defined below), to identify a customer's location and provide notification to one or more company representatives upon arrival of the customer at a given location. Additionally, the method allows for navigational services to be provided to customers, and real-time location determination, location tracking and confirmation to customers of location and rewards program status.

The disclosed method preferably can work through a system of wireless radio, sound and/or light-based beacons communicating with the customer's smartphone, computer system, or other electronic device. Wireless radio, sound and/or light-based beacons provide a system with real-time data about the customer's whereabouts, allowing for the automated confirmation and tracking described above and below. Depending on the type of location using the system, in certain circumstances one or more functions of the system may not be available to customers and companies alike. As a non-limiting example, where the system is used by a company that provides food and beverage services, a customer can place an order for food/beverages and the order delivered to the person at their current location as determined by the system. As another non-limiting example, a company may choose to implement the notification system to have staff members notified of the arrival of a customer who is assigned to a specific group or list within the system.

The following definitions are provided for a better understanding of the disclosure:

| Term | Definition |
|---|---|
| Electronic Identification, Location Tracking, Communication & Notification System Database | An electronic database where permissions and locations of guests and members are managed and stored. |
| Electronic Identification, Location Tracking, Communication & Notification System | A specially programmed system which monitors guest and member authorizations and locations based on information received from and being in communication with wireless radio, sound and/or light-based beacons which can be specifically positioned or placed in specific locations to monitor activity in controlled access areas. |
| Electronic Identification, Location Tracking, Communication & Notification App | A specially designed software application "App" that is installed on the customer's electronic system or device and which allows and directs the customer's electronic system or device to communicate with wireless radio, sound and/or light-based beacons in order to identify the customer's current location. |
| Customer | One or more persons who have entered the physical location of a company and/or are patrons of the company's business. |
| Administrator | One or more persons responsible for entering, reviewing, overseeing, managing and/or maintaining information about each customer in the system as well as configuring location, notifications and group/list management. |
| Facility Staff's Electronic System or Device | A computer system or device including, but not limited to, cell phone, smartphone, key card, tablet, laptop or other computer system belonging to a facility that is specially programmed and loaded with the Electronic Identification, Location Tracking, Communication & Notification Application or specially programmed to directly access and communicate with the Electronic Identification, Location Tracking, Communication & Notification System. |
| Customer's Electronic System or Device | A computer system or device including but not limited to cell phone, smartphone, key card, tablet, laptop or other computer system or electronic device belonging to a customer that is specially programmed with the Electronic Identification, Location Tracking, Communication & Notification App to permit communication with one or more wireless radio, sound and/or light-based beacons. |

| | |
|---|---|
| Wireless Radio, Sound and/or Light-based Beacon | A small receiver/transmitter capable of operating on short and/or long range wireless communication between electronic devices. Capabilities include, but are not limited to, pinpointing its own location, being programmed or designed to utilize the software in a smart phone, cellular phone or other electronic device to determine that device's location and bi-directional data transmission. Wireless radio, sound and/or light-based beacons can utilize technologies including, but not limited to, Near Field Communication (NFC), Bluetooth, WiFi, Light-Fidelity (LiFi), Ultrasound, InfraRed (IR), and Radio Frequency (RF). All of these technologies and similar current or similar later developed communication technologies are included in the term "wireless radio" wherever that term appears in this disclosure. |
| Device | A smartphone, cellular phone, computer, tablet, laptop or any electronic device with wireless radio, sound and/or light-based beacon capability and specifically programmed with the below defined "Permissions Application". |

BRIEF DESCRIPTION OF THE DRAWINGS

FIG. 1 is a block diagram of certain non-limiting components of the disclosed electronic identification, location tracking, communication and notification system and also illustrating the steps/communications generally involved in the registration of a customer's device;

FIG. 2 is a block diagram of certain non-limiting components of the disclosed electronic identification, location tracking, communication and notification system that are generally involved in the registration of a beacon location;

FIG. 3 is a block diagram of certain non-limiting components of the disclosed electronic identification, location tracking, communication and notification system and also illustrating the steps/communications generally involved in the determination of a customer's presence at a location in a first non-limiting embodiment;

FIG. 4 is a block diagram of certain non-limiting components of the disclosed electronic identification, location tracking, communication and notification system and also illustrating the steps/communications generally involved in the determination of a customer's presence at a location in a second non-limiting embodiment;

FIG. 5 is a block diagram and process flow for the notification rules engine of the disclosed electronic identification, location tracking, communication and notification system;

FIG. 6 is a block diagram of certain non-limiting components of the disclosed electronic identification, location tracking, communication and notification system and also illustrating the steps/communications generally involved in the determination and delivery of notifications;

FIG. 7 is a block diagram of certain non-limiting components of the disclosed electronic identification, location tracking, communication and notification system and also illustrating the steps/communications generally involved in the determination and delivery of notifications in an alternative embodiment;

FIG. 8 is a block diagram of certain non-limiting components of the disclosed electronic identification, location tracking, communication and notification system and also illustrating the steps/communications generally involved in the presence determination at a location rules engine;

FIG. 9 is a block diagram of certain non-limiting components of the disclosed electronic identification, location tracking, communication and notification system and also illustrating the steps/communications generally involved in the ordering of goods and/or services from the App;

FIG. 10 is a block diagram of certain non-limiting components of the disclosed electronic identification, location tracking, communication and notification system and also illustrating the steps/communications generally involved in the delivery of goods and/or services to the customer's current location; and FIG. 11 is a block diagram of certain non-limiting components of the disclosed electronic identification, location tracking, communication and notification system and also illustrating the steps/communications generally involved for a customer to opt-out of rating/monitoring by a facility, company and/or business.

DETAILED DESCRIPTION

FIG. 1 shows one method for allowing a customer to register their computer system or electronic device with the electronic identification, location tracking, communication and notification system of a particular company or business. This initial process allows a customer to be electronically and automatically tracked within the company's location, receive rewards program credits, order services delivered to their location and communicate with company employees.

At step F1a, a customer downloads and installs the Electronic Identification, Location Tracking, Communication & Notification Application "App" from their computer or any app store or marketplace including, but not limited to, the Apple App Store, Windows Store and Google Play marketplace. The App is downloaded to and installed on the customer's electronic system or device.

At step F1b, when the App is first opened, it prompts the user to register their electronic computer system or device with the electronic identification, location tracking, communication and notification system. This enables the customer to use their computer system or device to be automatically tracked within the customer's facility, communicate with the company, and order food, beverage or other products/services. Where the customer is interested in ordering food, beverage and/or other products or services, a menu or listing of the food, beverage and other products/services offered at the location can be displayed on the customer's electronic system or device to inform the customer of what is available at the location. If the user opens the App and does not wish to register the device then the App can operate in a non-registered mode that limits the services available on the device.

At step F1c, if the customer chooses to register the device with the electronic identification, location tracking, communication and notification system, a form can appear on the screen of the customer's electronic device prompting the customer for information including but not limited to their name, birthday, mailing address, email address, phone number, picture and/or credit card or other payment information for paying for goods/services ordered through the system. The system and software can also be designed such that multiple electronic systems and devices are associated with one account so that the rewards given to each electronic system or device are accumulated within one account (i.e. smartphones of a husband and wife and their children associated with one account so that all points or rewards earned based on activities of the family are accumulated into one account) and/or that payment information for one registered device can be used to pay for goods/services ordered by other electronic devices associated with the account. The required fields can be selected by the company and can depend on the specific company and needs of that company. The customer electronically submits the form when completed.

At step F1d, if during submission by the customer, the App determines that not all required fields are filled out, it will cause the electronic device to prompt the customer for the missing information. The user can resubmit the form with the missing information provided. At step F1e, once all required fields are provided and the form is electronically submitted by the customer, the electronically data is sent to the electronic identification, location tracking, communication and notification system.

At step F1f, the electronic identification, location tracking, communication and notification system electronically stores the customers form submissions along with some identifying information for the customer's device such as, but not limited to, the device name, UUID, MAC address, IP Address, or other unique identifiers. At step F1g, an electronic notification can be sent to the system administrator(s) via email, sms, mms, voice, fax or other electronic method of the new customer registration.

At step F1h, the system administrator can access the electronic identification, location tracking, communication and notification system to view and edit the new customer's profile. The system administrator can assign the customer to any group or list available, create notification rules for the customer or add information about the customer in its profile. At step F1i, any edits, if any, to the customer's profile by the system administrator can be electronically stored in the electronic identification, location tracking, communication and notification database.

FIG. 2 illustrates how a location is registered with the electronic identification, location tracking, communication and notification system.

At step F2a, a system administrator configures a wireless radio, sound and/or light-based beacon with information including, but not limited to, its name, unique identifier (MAC Address, UUID or similar), group/organization, unique number within an organization, location, wireless networks, etc. At step F2b, the configured wireless radio, sound and/or light-based beacon is physically installed at the configured location and tested to ensure its operability.

At step F2c, a system administrator electronically accesses the electronic identification, location tracking, communication and notification system to enter in the installed wireless radio, sound and/or light-based beacon's configuration and location information. Additional configuration of the beacon can also be performed at this step, which can include, but is not limited to, configuring notification settings, signal types, signal strengths, and device presence durations.

At step F2d, the wireless radio, sound and/or light-based beacon's configuration and location information can be electronically stored in the electronic identification, location tracking, communication and notification database.

FIG. 3 illustrates a first non-limiting embodiment of how the system determines the location of customer based on their registered device.

At step F3a, the wireless radio, sound and/or light-based beacons installed at various locations are constantly and automatically broadcasting their information including, but not limited to, its name, unique identifier (MAC Address, UUID or similar), group/organization, unique number within an organization, location, wireless networks, etc. At step F3b, the customer's electronic system or device with the Electronic Identification, Location Tracking, Communication & Notification Application "App" downloaded and running receives the broadcasted information from the wireless radio, sound and/or light-based beacons and automatically electronically transmits the information received, along with additional information including, but not limited to, signal type and strength to the Electronic Identification, Location Tracking, Communication & Notification system. This process repeats at configurable intervals so that the App can be frequently transmitting beacon information to the Electronic Identification, Location Tracking, Communication & Notification System.

At step F3c, the Electronic Identification, Location Tracking, Communication & Notification System queries the Electronic Identification, Location Tracking, Communication & Notification Database to determine the settings configured in step F2c for each of the beacon's information sent by the App on the customer's device. At step F3d, the Electronic Identification, Location Tracking, Communication & Notification System electronically analyzes the data received from the App and compares it against the retrieved configuration settings (See FIG. 8) for each wireless radio, sound and/or light-based beacon location it received information from. If the customer's device is not considered present at a location based on the electronic analysis of the Electronic Identification, Location Tracking, Communication & Notification System, it will continue to check the next data set received from the App and repeat this step. As a non-limiting example, the signal strength, which in one non-limiting example can be measured and calculated on a scale of 0 to 100% was configured to a minimum threshold of 80% (See block F8c of FIG. 8). This means that unless the customer's device receives a signal from the wireless radio, sound and/or light-based beacons greater then the 80% strength threshold, the customer will not be considered present at the beacon location by the Electronic Identification, Location Tracking, Communication & Notification System. Additionally, a minimum signal strength duration value may be specified for a given location (See Block F8d). If so configured, once the App on a customer's electronic system or device reports a signal strength value above the minimum threshold, it must continue to report a signal strength value above that minimum threshold for the configured duration threshold in order for the customer to be considered present at that beacon location by the system. Continuing from the non-limiting example above, if this minimum duration threshold is set to 20 seconds, the App must continue to report a signal strength value from a beacon above the 80% value for a duration of 20 consecutive seconds in order to consider the customer's electronic system or device present at that beacon location by the system.

At step F3e, if the analysis performed in F3d indicates that the customer's device is present at a given location, the status of that customer's device is updated with the information for such location. At step F3f, the Electronic Identification, Location Tracking, Communication & Notification Database prompts the Electronic Identification, Location Tracking, Communication & Notification System of the location confirmation so that any notification rules specified for that location and/or customer can be executed.

FIG. 4 illustrates an alternative embodiment of how the system determines the location of customer based on their registered device.

At step F4a, the customer's electronic system or device with the Electronic Identification, Location Tracking, Communication & Notification Application "App" downloaded and running is constantly and automatically broadcasting it's information including, but not limited to, its name, unique identifier (MAC Address, UUID or similar), group/organization, unique number within an organization, location, wireless networks, etc.

At step F4b, the wireless radio, sound and/or light-based beacons installed at various locations receive the broadcasted information from the App on the customer's device and transmits the information received, along with additional information including but not limited to signal type and strength to the Electronic Identification, Location Tracking, Communication & Notification system. This process repeats at configurable intervals so that the beacons are frequently automatically electronically transmitting customer device information to the Electronic Identification, Location Tracking, Communication & Notification System.

At step F4c, the Electronic Identification, Location Tracking, Communication & Notification System electronically queries the Electronic Identification, Location Tracking, Communication & Notification Database to determine the settings configured in F2c for each of the beacons information sent by the App on the customer's device.

At step F4d, the Electronic Identification, Location Tracking, Communication & Notification System analyzes the data received from the App and compares it against the retrieved configuration settings (See FIG. 8) for each wireless radio, sound and/or light-based beacon location it received information from. If the customer's device is not considered present at a beacon location based on the analysis of the Electronic Identification, Location Tracking, Communication & Notification System, it will continue to check the next data set received from the App and repeat this step. As a non-limiting example, the signal strength, which in one instance can be measured and calculated on a scale of 0 to 100% was configured to a minimum threshold of 80% (Block F8c of FIG. 8). This means that unless the customer's device receives a signal from the wireless radio, sound and/or light-based beacons greater then the 80% strength threshold, they will not be considered present at a location by the Electronic Identification, Location Tracking, Communication & Notification System. Additionally, a minimum signal strength duration value may be specified for a given location (Block F8d). If so configured, once the App on a customer's electronic system or device reports a signal strength value above the minimum threshold, it must continue to report a signal strength value above that minimum threshold for the configured duration threshold in order to be considered present at that location by the system. Continuing from the non-limiting example above, if this minimum duration threshold is set to 20 seconds, the App must continue to report a signal strength value above the 80% value for a duration of 20 consecutive seconds in order to consider the customer's electronic system or device present at that location by the system.

At step F4e, if the analysis performed in F4d indicates that the customer's device is present at a given location, the status of that customer's device is automatically updated with that locations information. At step F4f, the Electronic Identification, Location Tracking, Communication & Notification Database prompts the Electronic Identification, Location Tracking, Communication & Notification System of the location confirmation so that any notification rules specified for that location and/or customer can be executed.

FIG. 5 demonstrates how the notifications are configured within the Electronic Identification, Location Tracking, Communication & Notification System. This process can also be utilized to edit profile information and notifications for existing customers.

At step F5a, the Electronic Identification, Location Tracking, Communication & Notification System electronically queries the Electronic Identification, Location Tracking, Communication & Notification Database for the desired customer's existing information. This function can be typically reserved for a system administrator. At step F5b, the Electronic Identification, Location Tracking, Communication & Notification System displays the retrieved customer's profile information and verifies the accuracy of the information. The system administrator may also enter new information in the customer's profile if so desired.

At step F5c, once the customer's profile information is verified and/or updated, the system administrator may add the customer to one or more groups or lists maintained within the system. The system may also allow for default groups/lists to be assigned to all customers of a facility. At step F5d, once the groups and/or lists are selected, the system administrator, through the system, has the option of sending electronic notifications upon confirmation of a customer's presence as described in FIGS. 3 and 4, at any location configured in the Electronic Identification, Location Tracking, Communication & Notification System. If no notifications are desired, the customer's profile information can be updated in the Electronic Identification, Location Tracking, Communication & Notification Database.

At step F5e, if the system administrator desired to configure electronic notifications for the customer, through the system, they configure the electronic notification recipient(s) and type of electronic notification (though not limiting and a visual or audio notification could also be given) to be sent upon confirmation of their presence as described in FIGS. 3 and 4, at any location configured in the Electronic Identification, Location Tracking, Communication & Notification System. More then one notification can be configured for a given customer. At step F5f, the customer's profile information can be updated in the Electronic Identification, Location Tracking, Communication & Notification Database along with the configured notification settings.

FIG. 6 demonstrates how the system determines if a notification is to be delivered, where the notification is to be delivered and how the notification is to be delivered.

At step F6a, the customer's electronic system or device with the Electronic Identification, Location Tracking, Communication & Notification Application "App" downloaded and running can be constantly and automatically broadcasting the customer's electronic device information including, but not limited to, its name, unique identifier (MAC Address, UUID or similar), group/organization, unique number within an organization, location, wireless networks, etc. At step F6b, the wireless radio, sound and/or light-based beacons installed at various locations electronically receive the broadcasted information from the App on the customer's device and automatically electronically transmit the information received, along with additional information including but not limited to signal type and strength to the Electronic Identification, Location Tracking, Communication & Notification system. This process repeats at configurable intervals so that the beacons are frequently and automatically electronically transmitting customer device information to the Electronic Identification, Location Tracking, Communication & Notification System.

At step F6c, the Electronic Identification, Location Tracking, Communication & Notification System automatically queries the Electronic Identification, Location Tracking, Communication & Notification Database to determine the settings configured in F2c for each of the beacons information sent by the App on the customer's device. At step F6d, the Electronic Identification, Location Tracking, Communication & Notification System analyzes the data received from the App and compares it against the retrieved configuration settings (See FIG. 8) for each wireless radio, sound and/or light-based beacon location it received information from. If the customer's device is not considered present at a location based on the analysis of the Electronic Identification, Location Tracking, Communication & Notification System, it will continue to check the next data set received from the App and repeat this step. As a non-limiting example, the signal strength, which in one instance can be measured and calculated on a scale of 0 to 100% was configured to a minimum threshold of 80% (See Block F8c of FIG. 8). This means that unless the customer's device receives a signal from the wireless radio, sound and/or light-based beacons greater then the 80% strength threshold, the customer will not be considered present at a beacon location by the Electronic Identification, Location Tracking, Communication & Notification System. Additionally, a minimum signal strength duration value may be specified for a given location (Block F8d). If so configured, once the App on a customer's electronic system or device reports a signal strength value above the minimum threshold, it must continue to report a signal strength value above that minimum threshold for the configured duration threshold in order to be considered present at that location by the system. Continuing from the non-limiting example above, if this minimum duration threshold is set to 20 seconds, the App must continue to report a signal strength value above the 80% value for a duration of 20 consecutive seconds in order to consider the customer's electronic system or device present at that location by the system.

At step F6e, if the analysis performed in F3d indicates that the customer's device is present at a given location, the system determines if the user is a member of a group or list. If the user is not a member of a group or list, no notifications are sent and the status of that customer's device is updated with the location(s) information that the customer was determined to be at.

At step F6f, if f the customer is determined to be a member of a group or list based on the analysis performed in step F6e, the system next determines what, if any, notifications are configured for the group or list. If notifications are not configured for the group or list the customer is assigned to, no notifications are sent and the status of that customer's device is updated with the location(s) information.

At step F6g, if notifications are configured for the user based on the analysis in F6f, the Electronic Identification, Location Tracking, Communication & Notification Database is updated so the notifications can be queued up. At step F6h, the Electronic Identification, Location Tracking, Communication & Notification Database prompts the Electronic Identification, Location Tracking, Communication & Notification System to send out the configured notifications.

At step F6i, notifications are sent out by the Electronic Identification, Location Tracking, Communication & Notification System via any of the available and configured electronic methods. These methods include but are not limited to Email, SMS, MMS, On Screen and Voice. The notifications are designed to inform specific staff members or departments of the facility or company when specific customers arrive at the location. One non-limiting example of a notification can be a SMS message sent to a Host that one of their VIP customers has arrived at the facility. Another non-limiting example notification is a popup window on a computer screen for the security department when someone tagged on a Watch List arrives at the facility.

FIG. 7 demonstrates another embodiment of how the system determines if a notification is to be delivered, where the notification is to be delivered and how the notification is to be delivered.

At step F7a, the wireless radio, sound and/or light-based beacons installed at various locations are constantly and automatically broadcasting information including, but not limited to, its name, unique identifier (MAC Address, UUID or similar), group/organization, unique number within an organization, location, wireless networks, etc.

At step F7b, the customer's electronic system or device with the Electronic Identification, Location Tracking, Communication & Notification Application "App" downloaded and running receives the broadcasted information from the wireless radio, sound and/or light-based beacons and electronically and automatically transmits the information received, along with additional information including, but not limited to, signal type and strength to the Electronic Identification, Location Tracking, Communication & Notification system. This process can automatically repeat at configurable intervals so that the customer's device is frequently automatically transmitting beacon information to the Electronic Identification, Location Tracking, Communication & Notification System.

At step F7c, the Electronic Identification, Location Tracking, Communication & Notification System queries the Electronic Identification, Location Tracking, Communication & Notification Database to determine the settings configured in F2c for each of the beacon's information sent by the App on the customer's device.

At step F7d, the Electronic Identification, Location Tracking, Communication & Notification System analyzes the data received from the App and compares it against the retrieved configuration settings (See FIG. 8) for each wireless radio, sound and/or light-based beacon location it received information from. If the customer's device is not considered present at a location based on the analysis of the Electronic Identification, Location Tracking, Communication & Notification System, it will continue to check the next data set received from the App and repeat this step. As a non-limiting example, the signal strength, which in one instance can be measured and calculated on a scale of 0 to 100% was configured to a minimum threshold of 80% (See Block F8c of FIG. 8). This means that unless the customer's device receives a signal from the wireless radio, sound and/or light-based beacons greater then the 80% strength threshold, they will not be considered present at a location by the Electronic Identification, Location Tracking, Communication & Notification System. Additionally, a minimum signal strength duration value may be specified for a given location (Block F8d). If so configured, once the App on a customer's electronic system or device reports a signal strength value above the minimum threshold, it must continue to report a signal strength value above that minimum threshold for the configured duration threshold in order to be considered present at that location by the system. Continuing from the non-limiting example above, if this minimum duration threshold is set to 20 seconds, the App must continue to report a signal strength value above the 80% value for a duration of 20 consecutive seconds in order to consider the customer's electronic system or device present at that location by the system.

At step F7e, if the analysis performed in F3d indicates that the customer's device is present at a given location, the system determines if the user is a member of a group or list. If the user is not a member of a group or list, no notifications are sent and the status of that customer's device is updated with that locations information.

At step F7f, if the customer is determined to be a member of a group or list based on the analysis performed in F7e, the system next determines what, if any, notifications are configured for the group or list. If notifications are not configured for the group or list the customer is assigned to, no notifications are sent and the status of that customer's device can be updated with the customer location(s) information.

At step F7g, if notifications are configured for the user based on the analysis in step F7f, the Electronic Identification, Location Tracking, Communication & Notification Database is updated so the notifications can be queued up. At step F7h, the Electronic Identification, Location Tracking, Communication & Notification Database prompts the Electronic Identification, Location Tracking, Communication & Notification System to send out the configured notifications.

At step F7i notifications can be automatically sent out by the Electronic Identification, Location Tracking, Communication & Notification System via any of the available and configured methods. These methods include but are not limited to Email, SMS, MMS, On Screen and Voice. The notifications are designed to inform specific staff members or departments of the facility or company when specific customers arrive at the location. One non-limiting example of a notification can be a SMS message sent to a Host that one of their VIP customers has arrived at the facility. Another non-limiting example notification is a popup window on a computer screen for the security department when someone tagged on a Watch List arrives at the facility.

FIG. 8 demonstrates how a customer's presence at a location can be determined and configured within the Electronic Identification, Location Tracking, Communication & Notification System. This process can also be utilized to edit presence determination configurations already stored in the database.

At step F8a, the Electronic Identification, Location Tracking, Communication & Notification System queries the Electronic Identification, Location Tracking, Communication & Notification Database for a list of available locations. This function can be typically reserved for a system administrator.

At step F8b, the Electronic Identification, Location Tracking, Communication & Notification System displays a listing of available locations to configure. The system administrator can then select the location to configure or edit the configuration of.

At step F8c, once the location is selected, the system administrator may now specify the minimum signal strength threshold for a customer to be considered present at this particular location. This signal strength can be the measure of the strength of a known wireless radio, sound and/or light-based beacons transmitted signal strength as received by the customer's electronic system or device. As a non-limiting example, the signal strength can be measured and calculated on a scale of 0 to 100% where the minimum signal strength threshold is set to 80%. This means that unless the customer's device receives a signal from the wireless radio, sound and/or light-based beacons greater then the 80% strength threshold, they will not be considered present at a location by the Electronic Identification, Location Tracking, Communication & Notification System. The signal strength measurement is intended to approximate the distance between the customers electronic system or device and the wireless radio, sound and/or light-based beacons and can also include strength indicators including, but not limited to, RSSI (relative/received signal strength indicator) values.

At step F8d, once the minimum presence signal strength threshold has been entered, the system administrator has the option of specifying the minimum presence duration for that location. The minimum presence duration is a time value and can be expressed in any known and acceptable time format including, but not limited to, milliseconds, seconds, minutes, hours, etc. As a non-limiting example, the system administrator can configure the value to 20 seconds. In one instance the customer's electronic system or device must report to the Electronic Identification, Location Tracking, Communication & Notification system a signal strength above the minimum threshold specified in F8c for a period of at least 20 consecutive seconds in order to consider the customer's electronic system or device present at that location by the system.

At step F8e, the specific location's presence determination configuration profile can be updated in the Electronic Identification, Location Tracking, Communication & Notification Database.

FIG. 9 demonstrates how a customer is able to order goods and/or services from within or using the Electronic Identification, Location Tracking, Communication & Notification Application running on their electronic system or device.

At step F9a, the customer opens the App on their electronic system or device and selects the order Goods/Services button or link. The App can display all available Goods and/or Service types or categories available for the facility. The customer selects the type/category of good and/or service desired. At step F9b, the App then displays a menu of available goods and/or services for purchase in that type/category to the customer. The customer can select a single good or service, select multiple good and/or services, enter in a free text request, initiate an audio or video session with a facility staff member, or use any other available method to select the goods and/or services desired. At step F9c, the customer's order is electronically transmitted to the Electronic Identification, Location Tracking, Communication & Notification System.

At step F9d, the Electronic Identification, Location Tracking, Communication & Notification System electronically queries the Electronic Identification, Location Tracking, Communication & Notification Database for the notification method associated with the category of good and/or service selected. At step F9e, the Electronic Identification, Location Tracking, Communication & Notification System notifies the appropriate person or department for the category of goods and/or services ordered by the customer of the order and any information provided by the customer.

FIG. 10 demonstrates how a facility is able to deliver goods and/or services ordered by a customer (such as, but not limited to, the ordering process described and shown in FIG. 9) from within the Electronic Identification, Location Tracking, Communication & Notification Application running on the customer's electronic system or device to the current location of the customer at the time of delivery.

At step F10a, a facility staff member or other designated or authorized person uses an electronic system or device to access the Electronic Identification, Location Tracking, Communication & Notification System at the time the good and/or service is ready to be delivered to the customer. At step F10b, the Electronic Identification, Location Tracking, Communication & Notification System queries the Electronic Identification, Location Tracking, Communication & Notification Database for the current location of the customer who placed the order. The current location is determined as in FIGS. 3 and/or 4 and can be constantly and automatically updated within the Electronic Identification, Location Tracking, Communication & Notification System.

At step F10c, the Electronic Identification, Location Tracking, Communication & Notification System then returns the current location of the customer to the Facility staff member's or members' electronic system or device. As an alternative to the customer's current location, the system is programmed to also permit the customer to select another location for the delivery different from their current location (i.e. hotel room where they order from somewhere outside of their room, pool area where they order from somewhere outside of the pool area, etc.)

FIG. 11 demonstrates how a customer is able to opt-out of being rated/monitored from within the Electronic Identification, Location Tracking, Communication & Notification Application on the customer's electronic system or device.

At step F11a, when the Electronic Identification, Location Tracking, Communication & Notification System makes a determination that a customer's electronic system or device is present at a given location as described in FIGS. 3 and/or 4, a notification can be sent to the customer's electronic system or device via the Electronic Identification, Location Tracking, Communication & Notification Application "App" indicating the that their presence has been detected at a given location by the Electronic Identification, Location Tracking, Communication & Notification System. The notification can be made through a variety of methods including but not limited to Email, SMS, MIMS, On Screen and Voice.

At step F11b, the customer through the App running on their electronic system or device is presented with or can select a menu item to opt-out of being rated/tracked/monitored by the facility. If the customer does not make an affirmative selection to opt-out of being rated/monitored or makes an affirmative selection to allow rating/monitoring then the Electronic Identification, Location Tracking, Communication & Notification System is electronically notified so that customer rating/monitoring can continue.

At step F11c, if the customer makes an affirmative selection to Opt-Out of being rated/monitored, then the Electronic Identification, Location Tracking, Communication & Notification System is electronically notified of such selection. At step F11d, the Electronic Identification, Location Tracking, Communication & Notification System updates the Electronic Identification, Location Tracking, Communication & Notification Database of the customers' selection in F11b or F11c.

At step F11e, for those customers who made the affirmative selection to Opt-Out of being monitored, the Electronic Identification, Location Tracking, Communication & Notification System queries the Electronic Identification, Location Tracking, Communication & Notification Database to determine if the customer is a member of the Opt-Out Group or List as configured in FIG. 5 for that customer and if so, what the notification settings are for the given customer. At step F11f, for customers determined to be part of the Opt-Out group or list, a notification can be sent via the method configured for the customer and group type in FIG. 5.

The opt out system can also be programmed to function in the opposite as described above. In this alternative embodiment, after receiving the initial notification from the system to the customer that the customer can be electronically tracked by the system, the customer must affirmatively elect to be tracked and if no election is made the system does not track the customer.

The system that performs the above described functions and steps can include several components including, but not necessarily limited to, the following:

1. One or more Wireless Radio, Sound and/or Light-based Beacon(s)
2. One or more customer electronic computer system or device(s)
3. Electronic Identification, Location Tracking, Communication & Notification System
4. Electronic Identification, Location Tracking, Communication & Notification Database
5. A public and/or private computer network to connect or communicate the customer's device, beacons and Electronic Identification, Location Tracking, Communication & Notification system and database with each other.

The various components can be in electrical and wireless communication with each other.

The ability to electronically identify customers, track customer movements and notify providers of hospitality services of the presence of desired customers will provide significant administrative and financial benefits incident to operators of hospitality venues. Without limitation, these include the following benefits:

1. Provide hospitality service providers the ability to identify a customer and the customer's precise location within their facility.
2. Provide customers with real-time mapping and navigation in buildings and hospitality venues.
3. Provide hospitality service providers the ability to receive notifications when selected customers are present in their facility.
4. Analyze customer levels and behavior so as to tailor or modify service offerings and maximize profitability.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed as a critical, required, or essential features or elements of any or all the claims.

While the disclosure has been described in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An electronic system for determining or tracking a current location for an individual within a geographical area, said system comprising:
    an identification and location tracking computer specifically programmed to monitor, track and determine a current location of an individual within a geographical area;
    an identification and location tracking electronic database storing any permissions information for the individual, the electronic database in electronic communication with the tracking computer;
    a plurality of beacons disposed throughout the geographical area, the plurality of beacons are in electronic communication with the tracking computer;
    wherein the tracking computer is configured to determine a current location of the individual within the geographical area by determining a highest signal strength received from a plurality of signals sent by a portable electronic device physically possessed by the individual to the one or more of the plurality of beacons using only signals from the plurality of signals having signal strengths exceeding a predetermined signal strength percentage or threshold for at least a predetermined minimum or threshold period of time; and
    a software application running on the portable electronic device for permitting electronic wireless communication between the portable electronic device and the plurality of beacons, the portable electronic device carried by or on the individual when the individual travels or is present within the geographical area;
    wherein when the individual is in a communication range of the plurality of beacons, the portable electronic device is configured to transmit a signal to the plurality of beacons with the transmitted signal containing electronic data and the plurality of beacons transmit the electronic data to the tracking computer to allow the tracking computer to determine the current location of the individual within the geographical area; wherein the tracking computer is programmed to use a physical location data for a beacon from the plurality of beacons that received the highest signal strength for at least a predetermined minimum or threshold period of time as compared to all other beacons from the plurality of beacons that received the transmitted signal from the portable electronic device for the tracking computer determination of the current location of the individual within the geographical area;
    wherein the predetermined minimum or threshold period of time is a period of time that a signal strength of a signal received by the beacon sent by the portable electronic device must remain above a specific preset signal strength threshold configured for the beacon in order to be considered by the tracking computer when making a location determination;
    wherein the tracking computer is configured to include only signals whose signal strengths exceed the specific preset signal strength threshold for the predetermined minimum or threshold period of time (collectively "Criteria") when making the location determination and to exclude any other signals received by one or more beacons of the plurality of beacons that do not meet the Criteria.

2. The electronic system of claim 1 wherein electronic information representing the current location of the individual is stored within the tracking electronic database by the tracking computer.

3. The electronic system of claim 1 wherein each beacon of the plurality of beacons is a wireless radio, sound or light-based beacon.

4. The electronic system of claim 1 wherein the tracking computer is programmed to send an electronic notification to a designated person based on permissions information for the individual stored in the tracking electronic database when the tracking computer determines that the individual is present within the geographical area based on the electronic data received from the plurality of beacons.

5. The electronic system of claim 4 wherein the tracking computer is programmed to update the tracking electronic database with information concerning the current location of the individual within the geographical area.

6. The electronic system of claim 1 wherein once the individual is within the geographical area the portable electronic device maintains electronic communication with at least one of the plurality of beacons at all times.

7. The electronic system of claim 1 wherein the tracking computer is programmed to continuously or periodically update the tracking control electronic database with current location information for the individual within the geographical area.

8. The electronic system of claim 1, wherein the geographical area is a facility or place of business.

9. An electronic method for determining when an individual is present within a geographical area, said method comprising the steps of:
    (a) wirelessly transmitting electronic data in the form of a signal from a portable electronic device for receipt by one or more beacons of a plurality of beacons located in the geographical area that are in communication range with the portable electronic device; wherein the portable electronic device belongs to an individual who carries the portable electronic device or has the portable electronic device on his or her person while the individual is located in the geographical area;

(b) transmitting the received electronic data by each particular beacon receiving the signal to a tracking computer system;

(c) configuring the tracking computer system to only use transmitted signals that have signal strengths exceeding a predetermined signal strength percentage or threshold for at least a predetermined minimum or threshold period of time ("Criteria") when making a location determination; wherein the predetermined minimum or threshold period of time is a preset minimum time period that a strength of a signal received by a beacon from the portable electronic device must remain above a specific preset signal strength threshold for the beacon in order to be considered by the tracking computer when making the location determination; and (d) using only signals which meet the Criteria determining a current location of the individual within the geographical area by the tracking computer system using signal strengths for the transmitted signals which meet the Criteria for each beacon from the plurality of beacons that received the transmitted signals which meet the Criteria from the portable electronic device to identify a highest signal strength for at least a predetermined minimum or threshold period of time from all signal strengths received;

wherein step (d) comprises selecting a particular beacon from the plurality of beacons that had the highest signal strength for its communication with the portable electronic device and which met the Criteria and assigning a current location for the individual based on a location of the particular beacon in the geographical area.

10. The electronic method of claim 9 further comprising the step of storing or saving electronic data representing the current location for the individual in a tracking electronic database, the tracking electronic database in communication with the tracking computer system.

11. The electronic method of claim 9 wherein each beacon of said plurality of beacons is a wireless radio, sound or light-based beacon.

12. The electronic method of claim 9 further comprising the step of sending an electronic notification by the tracking computer system to a designated person based on permissions information for the individual stored in a tracking electronic database when the tracking computer determines that the individual is present within the geographical area.

13. The electronic method of claim 12 wherein the electronic notification informs the designated person of a presence of the individual within the geographical area.

14. The electronic method of claim 9 further comprising the step of periodically automatically determining a then current location for the individual within the geographical area and updating a tracking electronic database with any changes in location by the individual within the geographical area.

15. An electronic method for ordering and receiving a product for delivery by an individual located within a geographical area, said method comprising the steps of:

(a) selecting a product from a list of products displayed on a screen of a portable electronic device by an individual while the individual is located within a geographical area;

(b) wirelessly forwarding electronic data representing the product selected in step (a) to a tracking computer system;

(c) receiving the selected product by the individual at a current location for the individual within the geographic area determined by the following steps:

(i) wirelessly transmitting electronic data in the form of a signal from a portable electronic device for receipt by one or more beacons of a plurality of beacons located in the geographical area that are in communication range with the portable electronic device; wherein the portable electronic device belongs to the individual who carries the portable electronic device or has the portable electronic device on his or her person while the individual is located in the geographical area;

(ii) transmitting the received electronic data by each particular beacon receiving the signal to the tracking computer system;

(iii) configuring the tracking computer system to only use transmitted signals that have signal strengths exceeding a predetermined signal strength percentage or threshold for at least a predetermined minimum or threshold period of time ("Criteria") when making a location determination; wherein the predetermined minimum or threshold period of time is a preset minimum time period that a strength of a signal received by a beacon from the portable electronic device must remain above a specific preset signal strength threshold for the beacon in order to be considered by the tracking computer when making the location determination; and (iv) using only signals which meet the Criteria determining a current location of the individual within the geographical area by the tracking computer system using signal strengths for transmitted signals which meet the Criteria for each beacon from the plurality of beacons that received transmitted signals which meet the Criteria from the portable electronic device to identify a highest signal strength for at least a predetermined minimum or threshold period of time from all signal strengths received;

wherein step (iv) comprises selecting a particular beacon from the plurality of beacons that had the highest signal strength for its communication with the portable electronic device and assigning a current location for the individual based on a location of the particular beacon in the geographical area.

16. An electronic method for receiving an order for a product and delivering the ordered product to a current location for an individual within a geographical area, said method comprising the steps of:

(a) receiving an order for a product by a tracking computer system where the order was originated from an electronic portable electronic device belonging to an individual;

(b) determining a current location for the individual within a geographical area by the following steps:

(b1) wirelessly transmitting electronic data in the form of a signal from a portable electronic device for receipt by one or more beacons of a plurality of beacons located in the geographical area that are in communication range with the portable electronic device;

wherein the portable electronic device belongs to the individual who carries the portable electronic device or has the portable electronic device on his or her person while the individual is located in the geographical area;

(b2) transmitting the received electronic data by each particular beacon receiving the signal to the tracking computer system;

(b3) configuring the tracking computer system to only use transmitted signals that have signal strengths exceeding a predetermined signal strength percentage or threshold for at least a predetermined minimum or threshold period of time ("Criteria") when making a location determination; wherein the predetermined minimum or threshold period of time is a preset minimum time period that a strength of a signal received by a beacon from the portable electronic device must remain above a specific preset signal strength threshold for the beacon in order to be considered by the tracking computer when making the location determination;

(b4) using only signals which meet the Criteria determining a current location of the individual within the geographical area by the tracking computer system using signal strengths for the transmitted signals which meet the Criteria for each beacon from the plurality of beacons that received the transmitted signals which meet the Criteria from the portable electronic device to identify a highest signal strength for at least a predetermined minimum or threshold period of time from all signal strengths received;

wherein step (b3) comprises selecting a particular beacon from the plurality of beacons that had the highest signal strength for its communication with the portable electronic device and assigning a current location for the individual based on a location of the particular beacon in the geographical area; and (c) forwarding information representing the current location for the individual to a person responsible for delivering the product to the individual.

\* \* \* \* \*